(12) United States Patent
Lim et al.

(10) Patent No.: US 9,091,894 B2
(45) Date of Patent: Jul. 28, 2015

(54) DISPLAY SUBSTRATE, METHOD OF MANUFACTURING THE SAME AND DISPLAY PANEL HAVING THE SAME

(71) Applicant: Samsung Display Co., Ltd., Yongin (KR)

(72) Inventors: Ji-Hun Lim, Goyang-si (KR); Byung-Du Ahn, Hwaseong-si (KR); Je-Hun Lee, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 199 days.

(21) Appl. No.: 13/734,300

(22) Filed: Jan. 4, 2013

(65) Prior Publication Data

US 2014/0098311 A1 Apr. 10, 2014

(30) Foreign Application Priority Data

Oct. 4, 2012 (KR) ........................ 10-2012-0109772

(51) Int. Cl.
  *G02F 1/133* (2006.01)
  *G02F 1/1362* (2006.01)
  *G02F 1/1333* (2006.01)
  *G09G 3/36* (2006.01)

(52) U.S. Cl.
  CPC ........ *G02F 1/136209* (2013.01); *G02F 1/1333* (2013.01); *G09G 3/3648* (2013.01); *G02F 2201/58* (2013.01); *G09G 2360/144* (2013.01)

(58) Field of Classification Search
  CPC ................................. G02F 1/136209
  USPC .................. 349/12, 116; 345/175; 178/18.05
  See application file for complete search history.

(56) References Cited

U.S. PATENT DOCUMENTS

| | | | |
|---|---|---|---|
| 6,028,581 A * | 2/2000 | Umeya .......................... 345/104 |
| 6,947,102 B2 * | 9/2005 | den Boer et al. ................ 349/12 |
| 7,944,429 B2 | 5/2011 | Kang et al. |
| 8,325,155 B2 * | 12/2012 | Chang et al. ................... 345/175 |
| 8,411,212 B2 * | 4/2013 | Chiba et al. ...................... 349/12 |
| 8,605,059 B2 * | 12/2013 | Kurokawa et al. ............. 345/175 |
| 2010/0033450 A1 * | 2/2010 | Koyama et al. ................ 345/175 |
| 2012/0268427 A1 * | 10/2012 | Slobodin ........................ 345/175 |

FOREIGN PATENT DOCUMENTS

| | | |
|---|---|---|
| KR | 1020080001306 | 1/2008 |
| KR | 1020080068343 | 7/2008 |

* cited by examiner

*Primary Examiner* — James Dudek
(74) *Attorney, Agent, or Firm* — H.C. Park & Associates, PLC

(57) ABSTRACT

A display substrate includes a substrate, a switching element, a pixel electrode, and a light sensing part. The switching element is disposed on the substrate and is electrically connected to a gate line and a data line. The pixel electrode is electrically connected to the switching element. The light sensing part is electrically connected to the switching element and the pixel electrode, and is configured to control a grayscale of a pixel according to a brightness of an external light. The pixel includes the pixel electrode.

16 Claims, 9 Drawing Sheets

DISPLAY SUBSTRATE, METHOD OF MANUFACTURING THE SAME AND DISPLAY PANEL HAVING THE SAME

CROSS-REFERENCE TO RELATED APPLICATION

This application claims priority from and the benefit of Korean Patent Application No. 10-2012-0109772, filed on Oct. 4, 2012, which is hereby incorporated by reference for all purposes as if fully set forth herein.

BACKGROUND

1. Field

Exemplary embodiments of the present invention relate to a display substrate, a method of manufacturing the display substrate, and a display panel having the display substrate. More particularly, exemplary embodiments of the present invention relate to a display substrate used in a display apparatus, a method of manufacturing the display substrate, and a display panel having the display substrate.

2. Discussion of the Background

A display apparatus, such as a liquid crystal display apparatus, an electrophoretic display apparatus, and a micro electro-mechanical system (MEMS) display apparatus, includes a display panel configured to display an image.

In a relatively bright environment, when a grayscale of the image displayed on the display panel is high, visibility of the display panel may decrease.

In a relatively dark environment, when the grayscale of the image displayed on the display panel is low, visibility of the display panel may decrease.

Thus, a technique for increasing the visibility of the display apparatus according to a brightness of ambient light around the display panel is required.

SUMMARY

Exemplary embodiments of the present invention provide a display substrate capable of increasing a visibility of a display apparatus.

Exemplary embodiments of the present invention also provide a method of manufacturing the above-mentioned display substrate.

Exemplary embodiments of the present invention also provide a display panel having the above-mentioned display substrate.

Additional features of the invention will be set forth in the description which follows, and in part will be apparent from the description, or may be learned by practice of the invention An exemplary embodiment of the present invention discloses a display substrate including a base substrate, a switching element, a pixel electrode and a light sensing part. The switching element is formed on the base substrate and is electrically connected to a gate line and a data line. The pixel electrode is electrically connected to the switching element. The light sensing part is electrically connected to the switching element and the pixel electrode and controls a grayscale of a pixel according to a brightness of an external light. The pixel includes the pixel electrode. The external light is applied to the light sensing part from an external environment.

An exemplary embodiment of the present invention also discloses a method of manufacturing a display panel. In the method, a switching element and a light sensing part are formed on a base substrate and are electrically connected with each other. An organic insulating layer is formed on the switching element and the light sensing part. A pixel electrode is formed on organic insulating layer and is electrically connected to the switching element and the light sensing part. A level of a pixel voltage applied to the pixel electrode is controlled according to a brightness of an external light applied to the light sensing part from an external environment.

An exemplary embodiment of the present invention also discloses a display panel including a lower substrate and an upper substrate. The lower substrate includes a first base substrate, a switching element formed on the base substrate and electrically connected to a gate line and a data line, a pixel electrode electrically connected to the switching element, and a light sensing part electrically connected to the switching element and the pixel electrode and configured to control a grayscale of a pixel according to a brightness of an external light. The pixel includes the pixel electrode. The external light is applied to the light sensing part from an external environment. The upper substrate includes a second base substrate facing the first base substrate and a common electrode formed on the second base substrate. The common electrode and the pixel electrode form an electric field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
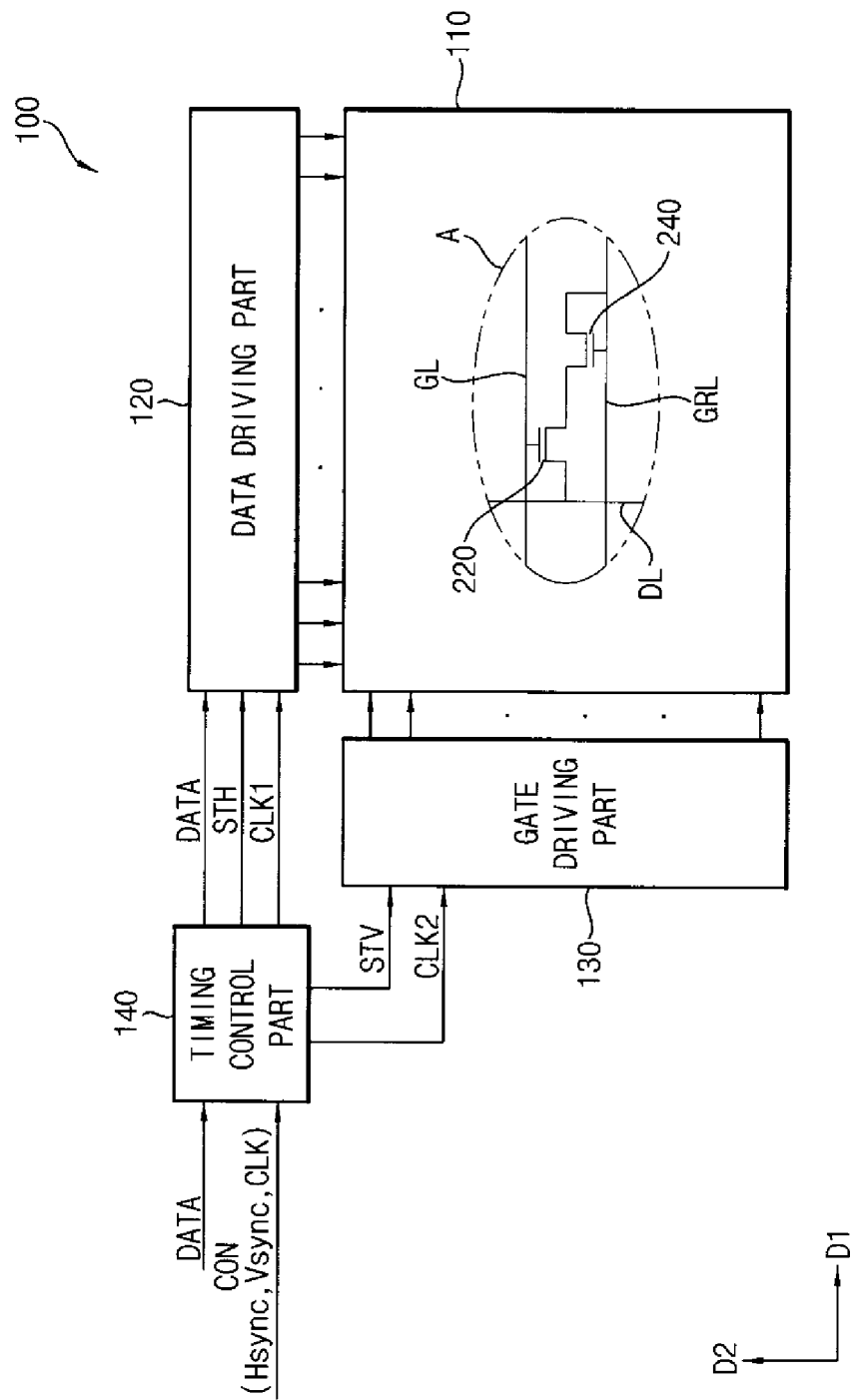
FIG. 1 is a block diagram illustrating a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers, regions, films, panels, etc., may be exaggerated for clarity. Like reference numerals denote like elements.

It will be understood that when an element such as a layer, film, region, or substrate is referred to as being "on" or "connected to" another element, it can be directly on or directly connected to the other element, or intervening elements may be present. In contrast, when an element is referred to as being "directly on" or "directly connected to" another element, there are no other elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram illustrating a display apparatus according to an exemplary embodiment of the present invention.

Referring to FIG. 1, the display apparatus according to the present exemplary embodiment includes a display panel 110, a data driving part 120, a gate driving part 130, and a timing control part 140.

The display panel 110 receives an image data DATA to display an image. For example, the image data DATA may be a two-dimensional plane image data. Alternatively, the image data DATA may include a left-eye image data and a right-eye image data to display a three-dimensional stereoscopic image.

The display panel 110 includes a plurality of gate lines GL substantially parallel with a first direction D1, a plurality of data lines DL substantially parallel with a second direction D2 substantially perpendicular to the first direction D1, and a plurality of pixels. The first direction D1 may be substantially parallel with a long side of the display panel 110, and the second direction D2 may be substantially parallel with a short side of the display panel 110.

Each of the pixels includes a switching element 220 electrically connected to the gate line GL and the data line DL, a pixel electrode 270 (shown in FIG. 3) electrically connected to the switching element 220, and a light sensing part 240 electrically connected to the switching element 220 and the pixel electrode 270. The light sensing part 240 controls a grayscale of the pixel according to a brightness of an external light applied from an external.

The switching element 220 may include a first thin-film transistor (TFT) and the light sensing part 240 may include a second TFT.

The external light need not be applied to the first TFT of the switching element 220. However, the first TFT of the switching element 220 may instead be exposed to an internal light generated from a backlight assembly (not shown), and thus the first TFT of the switching element 220 includes a material which is stable in the presence of light. Thus, the switching element 220 includes a material having low light reactivity. For example, the first TFT of the switching element 220 may be an IGZO (In—Ga—Zn—O) transistor including a single thin-film oxide semiconductor material such as IGZO.

The second TFT of the light sensing part 240 may be an oxide semiconductor transistor. For example, the second TFT of the light sensing part 240 may be a IGZO transistor. Alternatively, the second TFT of the light sensing part 240 may be an amorphous silicon (a-SI) transistor.

In addition, the display panel 110 further includes a ground line GRL. The ground line GRL is electrically connected to the light sensing part 240 to transfer a ground voltage to the light sensing part 240. The ground line GRL may be substantially parallel with the gate line GL.

The data driving part 120 outputs a data signal based on the image data DATA to the data lines DL in response to a first clock signal CLK1 and a horizontal start signal STH provided from the timing control part 140.

The gate driving part 130 generates a gate signal using a vertical start signal STV and a second clock signal SLK2 provided from the timing control part 140 and outputs the gate signal to the gate line GL.

The timing control part 140 receives the image data DATA and a control signal CON from an external source. The control signal CON may include a horizontal synchronous signal Hsync, a vertical synchronous signal Vsync, and a clock signal CLK.

The timing control part 140 generates the horizontal start signal STH using the horizontal synchronous signal Hsync and outputs the horizontal start signal STH to the data driving part 120. In addition, the timing control part 140 generates the vertical start signal STV using the vertical synchronous signal Vsync and outputs the vertical start signal STV to the gate driving part 130. In addition, the timing control part 140 generates the first clock signal CLK1 and the second clock signal CLK2 using the clock signal CLK, and outputs the first clock signal CLK1 to the data driving part 120, and outputs the second clock signal CLK2 to the gate driving part 130.

Figure 2:
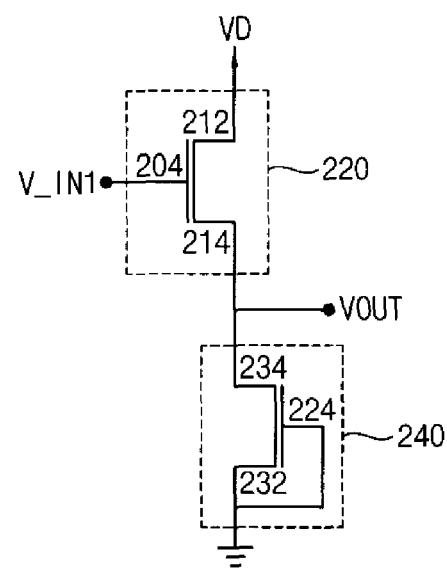
FIG. 2 is a circuit diagram illustrating a switching element and a light sensing part of FIG. 1.

FIG. 2 is a circuit diagram illustrating the switching element 220 and the light sensing part 240 of FIG. 1.

Referring to FIGS. 1 and 2, the switching element 220 includes a first gate electrode 204, a first source electrode 212, and a first drain electrode 214. The light sensing part 240 includes a second gate electrode 224, a second source electrode 232, and a second drain electrode 234.

When a gate voltage V_IN1 of the gate signal is applied to the first gate electrode 204 of the switching element 220 and the external light is not applied to the light sensing part 240, the switching element 220 is turned on and the light sensing part 240 is turned off. Thus, an output voltage VOUT outputted from the first drain electrode 214 of the switching element 220 and the second drain electrode 234 of the light sensing part 240 and applied to the pixel electrode 270 has a first level corresponding to a data voltage VD of the data signal.

When the gate voltage V_IN1 of the gate signal is applied to the first gate electrode 204 of the switching element 220 and the external light is applied to the light sensing part 240, the switching element 220 is turned on and the light sensing part 240 is turned on. Thus, the output voltage VOUT outputted from the first drain electrode 214 of the switching element 220 and the second drain electrode 234 of the light sensing part 240 has a second level lower than the first level.

When the external light is applied to the light sensing part 240, a light current transferred from the second source electrode 232 to the second drain electrode 234 through a channel is generated. For example, the light current transferred from the second source electrode 232 to the second drain electrode 234 through the channel may have a first value (e.g., 0) when the external light is not applied to the light sensing part 240, and the light current transferred from the second source electrode 232 to the second drain electrode 234 through the channel may have a second value greater than the first value when the external light is applied to the light sensing part 240.

Thus, the light sensing part 240 may increase a pixel voltage of the pixel electrode 270 to increase the grayscale of the pixel when the external light is not applied to the display panel 110, and may decrease the pixel voltage of the pixel electrode 270 to decrease the grayscale of the pixel when the external light is applied to the display panel 110.

Figure 3:
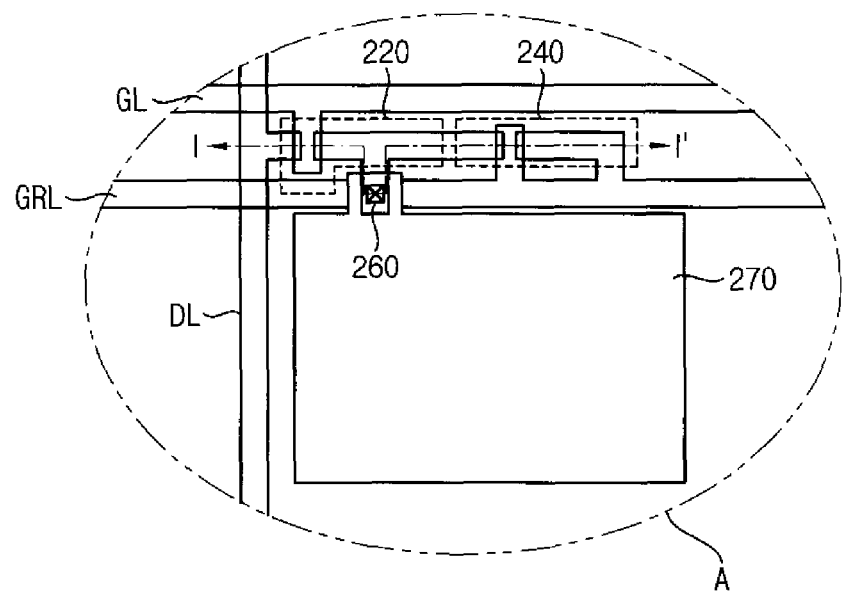
FIG. 3 is an enlarged view illustrating a portion 'A' of FIG. 1
Figure 4:
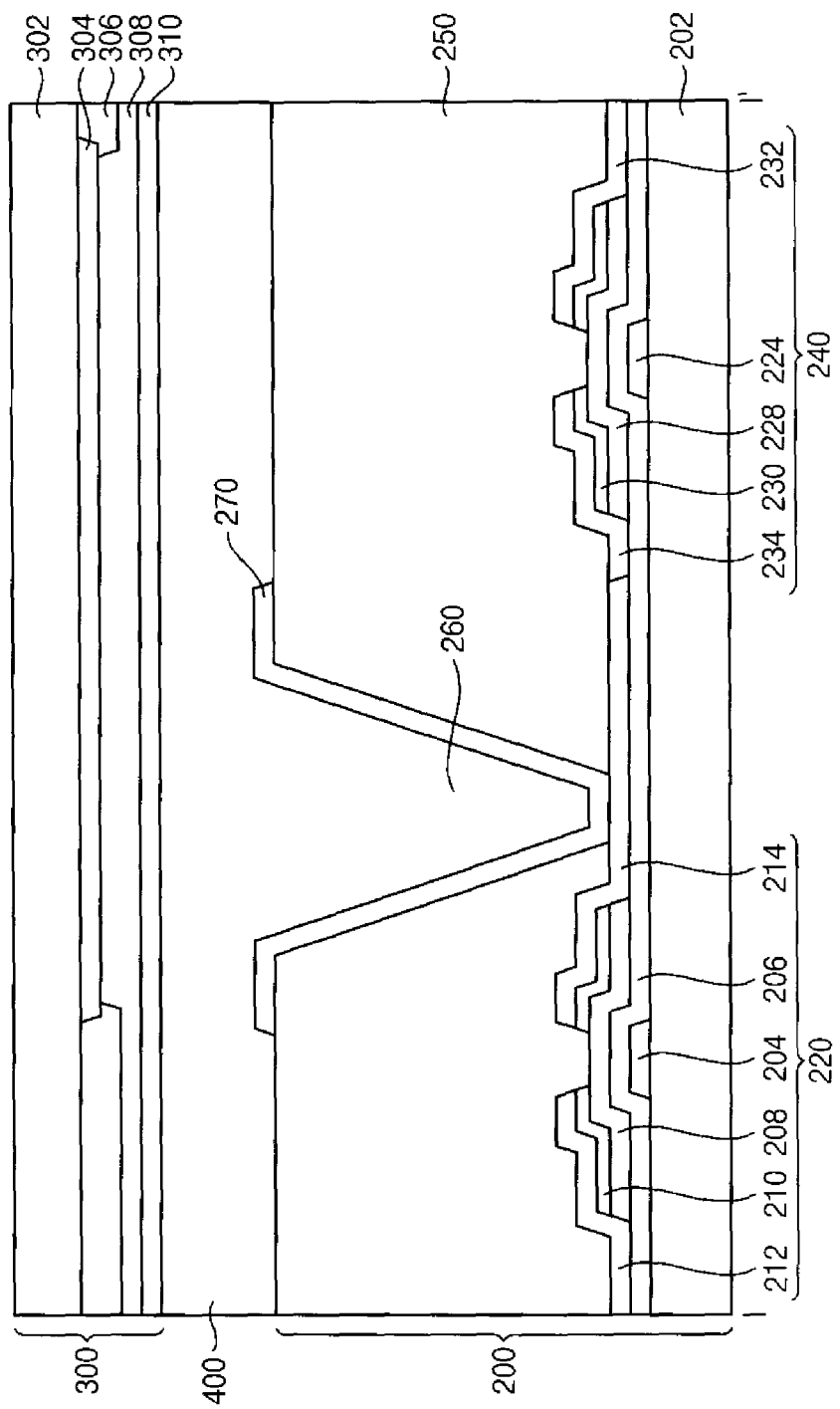
FIG. 4 is a cross-sectional view taken along a line I-I' of FIG. 3

FIG. 3 is an enlarged view illustrating a portion 'A' of FIG. 1, and FIG. 4 is a cross-sectional view taken along a line I-I' of FIG. 3.

Referring to FIGS. 1 to 4, the display panel includes a lower substrate 200, an upper substrate 300, and a liquid crystal layer 400.

The lower substrate 200 includes a first base substrate 202, the gate line GL, the data line DL, the ground line GRL, the switching element 220, the light sensing part 240, the organic insulating layer 250, and a pixel electrode 270.

The gate line GL, the data line DL, the ground line GRL, the switching element 220, and the light sensing part 240 are formed on the first base substrate 202. The first base substrate 202 may be a glass substrate. Alternatively, the first base substrate 202 may be a plastic substrate.

The switching element 220 includes a first gate electrode 204 formed on the first base substrate 202 and extended from the gate line GL, a gate insulating layer 206 formed on the first gate electrode 204, a first active layer 208 formed on the gate insulating layer 206, a first ohmic-contact layer 210 separately formed on the first active layer 208, a first source electrode 212 formed on the first ohmic-contact layer 210 and extended from the data line DL, and a first drain electrode 214 formed on the first ohmic-contact layer 210 and spaced apart from the first source electrode 212.

The switching element 220 is covered by a light blocking layer 306 in the upper substrate 300. Thus, the external light may not be applied to the switching element 220. The switching element 220 may be exposed to the internal light generated from the backlight assembly, and thus the switching element 220 includes the material which is stable in the presence of light. For example, the first TFT of the switching element 220 may include the single thin-film oxide semiconductor material such as IGZO.

The light sensing part 240 includes a second gate electrode 224 formed on the first base substrate 202 and electrically connected to the ground line GRL, the gate insulating layer 206 formed on the second gate electrode 224, a second active layer 228 formed on the gate insulating layer 206, a second ohmic-contact layer 230 separately formed on the second active layer 228, a second source electrode 212 formed on the second ohmic-contact layer 230 and electrically connected to the ground line GRL, and a second drain electrode 234 formed on the second ohmic-contact layer 230, spaced apart from the second source electrode 232 and electrically connected to the first drain electrode 214 of the switching element 220.

The light sensing part 240 is not covered by the light blocking layer 306 in the upper substrate 300. Thus, the light sensing part 240 may be exposed to the external light.

A work function of the second active layer 228 may be equal to or greater than a work function of the second gate electrode 224. In addition, a band-gap of the second active layer 228 may be about 3 electron volts (eV) to about 5 electron volts (eV), and the band-gap of the second actively layer 228 may be about 3 electron volts (eV). An intensity of a donor disposed in a forbidden band between a balance band and a conductive band of the second active layer 228 may be about $1*10^{17}/cm^3$. The second active layer 228 may include zinc (Zn), and the second active layer 228 may further include at least one of indium (In) and tin (Sn).

The organic insulating layer 250 is formed on the switching element 220 and the light sensing part 240 to protect the switching element 220 and the light sensing part 240.

The pixel electrode 270 is formed on the organic insulating layer 250, and electrically connected to the first drain electrode 214 of the switching element 220 through a contact hole 260 formed through the organic insulating layer 250. Thus, the pixel electrode 270 is electrically connected to the second drain electrode 234 of the light sensing part 240. The pixel electrode 270 may include indium tin oxide (ITO). Alternatively, the pixel electrode 270 may include indium zinc oxide (IZO).

The lower substrate 200 may further include a first alignment layer (not shown) on the pixel electrode 270. The first alignment layer aligns a liquid crystal of the liquid crystal layer 400.

The lower substrate 200 may be a display substrate including the pixel electrode 270. In addition, the lower substrate 200 may be a thin-film transistor substrate including the switching element 220.

The upper substrate 300 includes a second base substrate 302, a color filter layer 304, a light blocking layer 306, an over-coating layer 308, and a common electrode 310.

The second base substrate 302 faces the first base substrate 202. The second base substrate 302 may be a glass substrate. Alternatively, the second base substrate 302 may be a plastic substrate.

The color filter layer 304 and the light blocking layer 306 are formed on the second base substrate 302. The color filter layer 304 may include a red color filter, a green color filer, or a blue color filter. The light blocking layer 306 may be a black matrix.

The over-coating layer 308 is formed on the color filter layer 304 and the light blocking layer 306. The over-coating layer 308 flattens on the color filer layer 304 and the light blocking layer 306.

The common electrode 310 is formed on the over-coating layer 308 and faces the pixel electrode 270 of the lower substrate 200. The common electrode 310 may include ITO. Alternatively, the common electrode 310 may include IZO.

A pixel voltage applied to the pixel electrode 270 and a common voltage applied to the common electrode 310 forms an electric field.

The upper substrate 300 may further include a second alignment layer (not shown) on the common electrode 310. The second alignment layer aligns the liquid crystal of the liquid crystal layer 400.

The upper substrate 300 may be a color filter substrate including the color filter layer 304.

The liquid crystal layer 400 is interposed between the lower substrate 200 and the upper substrate 300, and includes the liquid crystal. An alignment of a liquid crystals in the liquid crystal layer 400 is changed by the electric field formed by the pixel voltage applied to the pixel electrode 270 and the common voltage applied to the common electrode 310.

The second drain electrode 234 of the light sensing part 240 in the lower substrate 200 is electrically connected to the pixel electrode 270. Thus, the light sensing part 240 controls a level of the pixel voltage applied to the pixel electrode 270 according to the brightness of the external light applied to the light sensing part 240.

Specifically, the second gate electrode 224 and the second source electrode 232 of the light sensing part 240 are electrically connected to the ground line GRL, and thus the level of the pixel voltage applied to the pixel electrode 270 is increased as the brightness of the external light applied to the light sensing part 240 is decreased. Thus, the light sensing part 240 increases the grayscale of the pixel including the pixel electrode 270 as the brightness of the external light applied to the light sensing part 240 is decreased.

In addition, the second gate electrode 224 and the second source electrode 232 of the light sensing part 240 are electrically connected to the ground line GRL, and thus the level of the pixel voltage applied to the pixel electrode 270 is decreased as the brightness of external light applied to the light sensing part 240 is increased. Thus, the light sensing part 240 decreases the grayscale of the pixel including the pixel electrode 270 as the brightness of the external light applied to the light sensing part 240 is increased.

Figure 5:
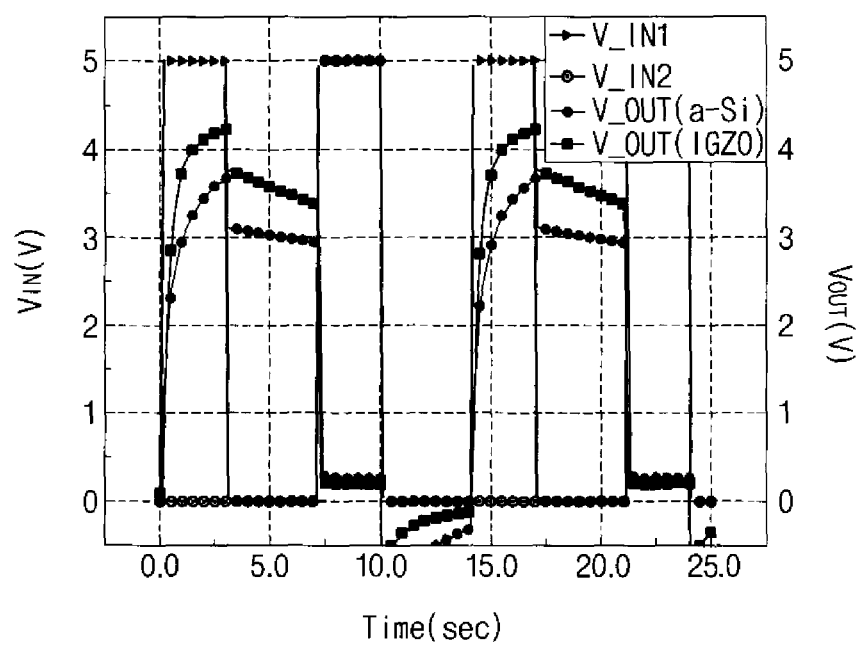
FIG. 5 is a graph illustrating a pixel voltage according to a brightness of an external light applied to the light sensing part of FIGS. 1 to 4.

FIG. 5 is a graph illustrating the pixel voltage according to the brightness of the external light applied to the light sensing part 240 of FIGS. 1 to 4.

In FIG. 5, 'V_IN1' indicates the gate voltage of the gate signal applied to the switching element 220. 'V_IN2' indicates a light voltage converted from the brightness of the external light applied to the light sensing part 240. 'V_OUT (a-SI)' indicates the pixel voltage applied to the pixel electrode 270 from the first drain electrode 214 of the switching element 220 and the second drain electrode 234 of the light sensing part 240, when each of the switching element 220 and the light sensing part 240 is the a-SI transistor. 'V_OUT (IGZO)' indicates the pixel voltage applied to the pixel electrode 270 from the first drain electrode 214 of the switching element 220 and the second drain electrode 234 of the light sensing part 240, when each of the switching element 220 and the light sensing part 240 is the IGZO transistor.

Referring to FIGS. 1 to 5, the switching element 220 and the light sensing part 240 act as an inverter.

Specifically, the pixel voltage V_OUT(a-SI) applied to the pixel electrode 270 from the first drain electrode 214 of the switching element 220 and the second drain electrode 234 of the light sensing part 240 was about 2.9 volts to about 3.7 volts when the gate voltage V_IN1 applied to the switching element 220 was about 5 volts and the light voltage V_IN2 applied to the light sensing part 240 and representing the external light was about 0 volt, in a case where the light sensing part 240 was the a-SI transistor.

In addition, the pixel voltage V_OUT(a-SI) applied to the pixel electrode 270 from the first drain electrode 214 of the switching element 220 and the second drain electrode 234 of the light sensing part 240 was about 0.2 volts when the gate voltage V_IN1 applied to the switching element 220 was about 5 volts and the light voltage V_IN2 applied to the light sensing part 240 and representing the external light was about 5 volts, in the case where the light sensing part 240 was the a-SI transistor.

A level of the pixel voltage V_OUT(a-SI) may be increased when a level of the light voltage V_IN2 is low, when the light voltage V_IN2 applied to the light sensing part 240 and representing the external light has a positive (+) value. For example, the pixel voltage V_OUT (a-SI) may be about 0.5 volts when the light voltage V_IN2 is about 4 volts, and the pixel voltage V_OUT(a-SI) may be about 1.0 volt when the light voltage V_IN2 is about 3 volts.

Thus, the light sensing part 240 increases the pixel voltage V_OUT(a-SI) as the brightness of the external light is decreased, and decreases the pixel voltage V_OUT(a-SI) as the brightness of the external light is increased.

In addition, the pixel voltage V_OUT(IGZO) applied to the pixel electrode 270 from the first drain electrode 214 of the switching element 220 and the second drain electrode 234 of the light sensing part 240 was about 3.7 volts to about 4.2 volts when the gate voltage V_IN1 applied to the switching element 220 was about 5 volts and the light voltage V_IN2 applied to the light sensing part 240 and representing the external light was about 0 volts, in the case where the light sensing part 240 was the IGZO transistor.

In addition, the pixel voltage V_OUT(IGZO) applied to the pixel electrode 270 from the first drain electrode 214 of the switching element 220 and the second drain electrode 234 of the light sensing part 240 was about 0.2 volts when the gate voltage V_IN1 applied to the switching element 220 was about 5 volts and the light voltage V_IN2 applied to the light sensing part 240 and representing the external light was about 5 volts, in the case where the light sensing part 240 was the IGZO transistor.

A level of the pixel voltage V_OUT(IGZO) may be increased as the level of the light voltage V_IN2 is low, when the light voltage V_IN2 applied to the light sensing part 240 and representing the external light has the positive (+) value. For example, the pixel voltage V_OUT (IGZO) may be about 0.5 volts when the light voltage V_IN2 is about 4 volts, and the pixel voltage V_OUT(IGZO) may be about 1.0 volt when the light voltage V_IN2 is about 3 volts.

Thus, the light sensing part 240 increases the pixel voltage V_OUT(IGZO) as the brightness of the external light decreases, and decreases the pixel voltage V_OUT(a-SI) as the brightness of the external light increases.

An electron mobility of the IGZO transistor is greater than an electron mobility of the a-SI transistor. Thus, a gain indicating a ratio of the pixel voltage V_OUT(IGZO) to the gate voltage V_IN1 and the light voltage V_IN2 is lower in the case where the light sensing part 240 is the IGZO transistor than a gain indicating a ratio of the pixel voltage V_OUT(a-SI) to the gate voltage V_IN1 and the light voltage V_IN2 in the case where the light sensing part 240 is the a-SI transistor.

FIGS. 6A to 6D are cross-sectional views illustrating a method of manufacturing the display panel 110 in FIG. 4.

Figure 6A:
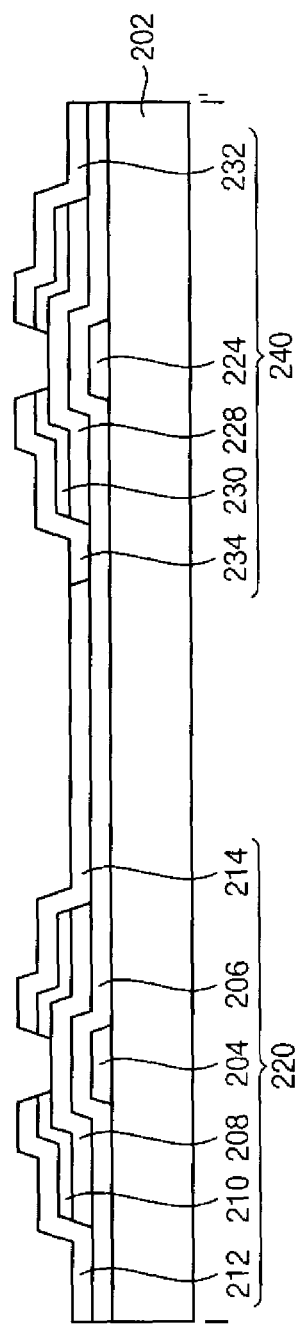
FIG. 6A, FIG. 6B, FIG. 6C, and FIG. 6D are cross-sectional views illustrating a method of manufacturing a display panel in FIG. 4.

Referring to FIG. 6A, the switching element 220 and the light sensing part 240 are formed on the first base substrate 202. The switching element 220 and the light sensing part 240 may be formed by the same process.

The switching element 220 includes the first gate electrode 204 extended from the gate line GL, the gate insulating layer 206 formed on the first gate electrode 204, the first active layer 208 formed on the gate insulating layer 206, the first ohmic-contact layer 210 separately formed on the first active layer 208, the first source electrode 212 formed on the first ohmic-contact layer 210 and extended from the data line DL, and the first drain electrode 214 formed on the first ohmic-contact layer 210 and spaced apart from the first source electrode 212.

The light sensing part 240 includes the second gate electrode 224 electrically connected to the ground line GRL, the gate insulating layer 206 formed on the second gate electrode 224, the second active layer 228 formed on the gate insulating layer 206, the second ohmic-contact layer 230 separately formed on the second active layer 228, the second source electrode 212 formed on the second ohmic-contact layer 230 and electrically connected to the ground line GRL, and the second drain electrode 234 formed on the second ohmic-contact layer 230, spaced apart from the second source electrode 232 and electrically connected to the first drain electrode 214 of the switching element 220.

Figure 6B:
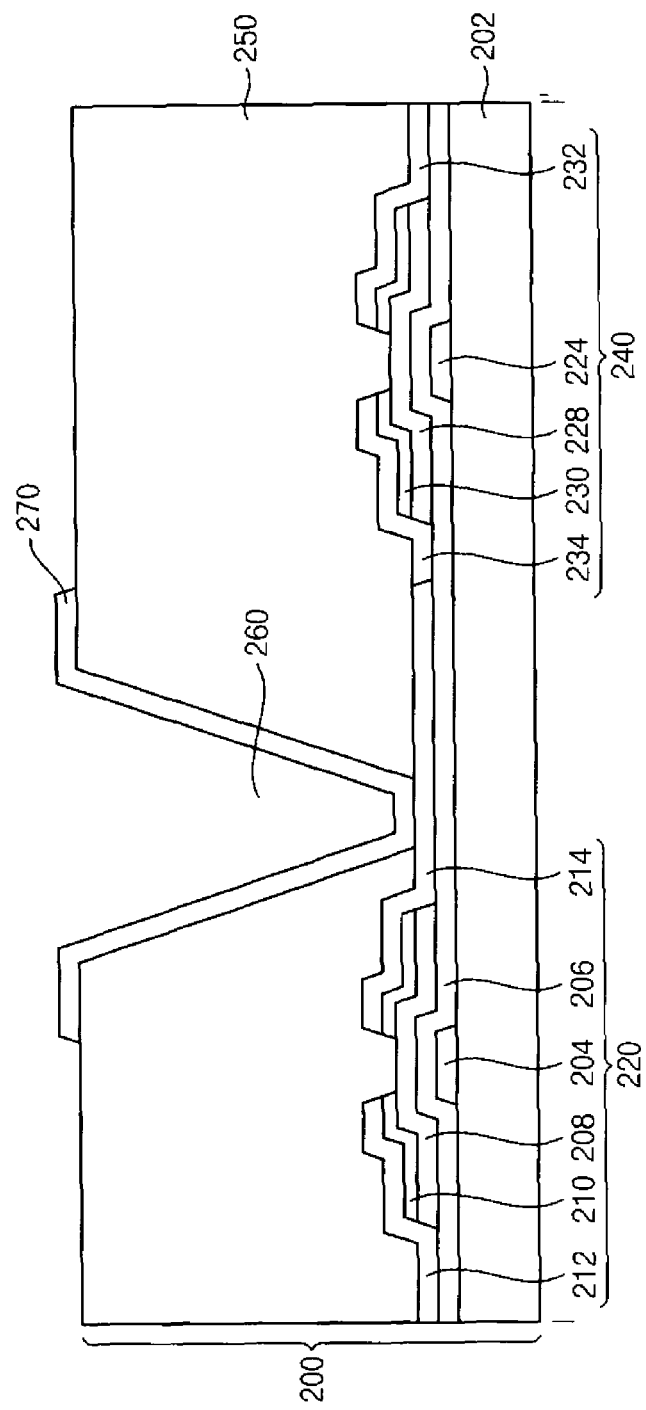

Referring to FIG. 6B, the organic insulating layer 250 is formed on the switching element 220 and the light sensing part 240. The pixel electrode 270 is formed on the insulating layer 250. The pixel electrode 270 formed on the insulating layer 250 is electrically connected to the first drain electrode 214 of the switching element 220 through the contact hole 260 formed through the organic insulating layer 250. Thus, the lower substrate 200 is formed.

Figure 6C:
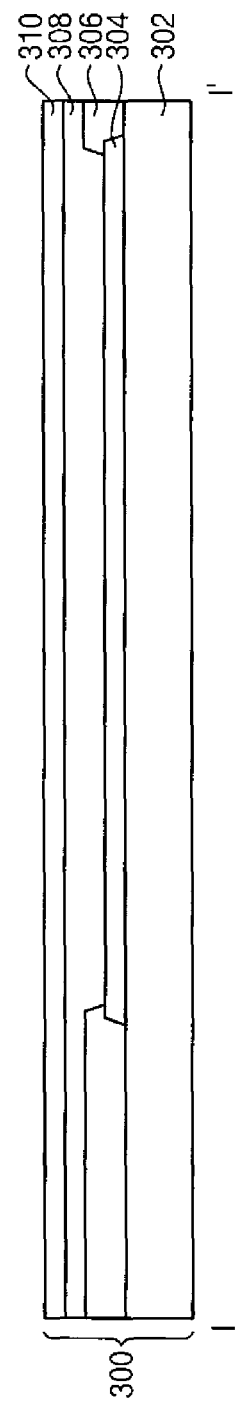
Figure 6D:
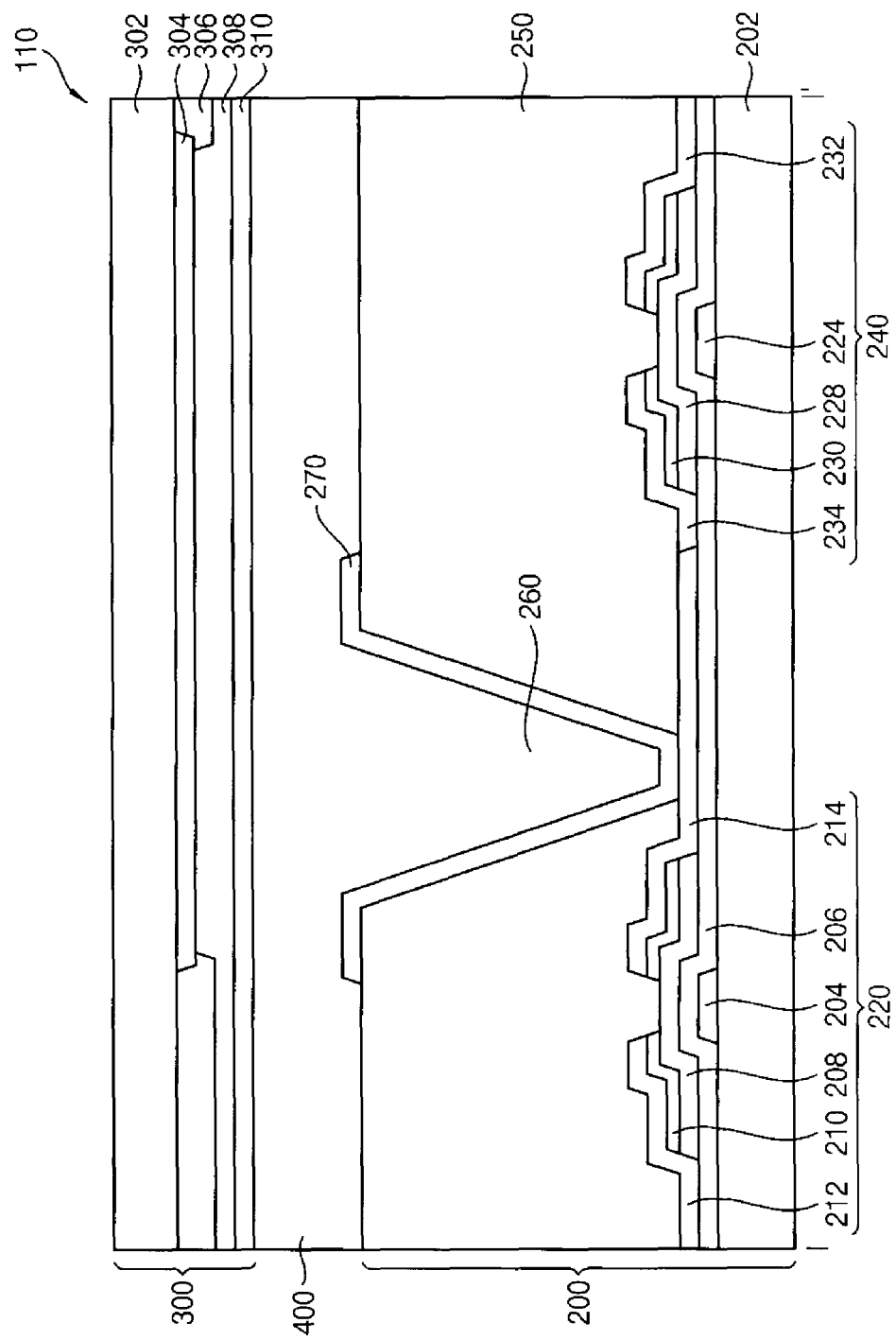

Referring to FIG. 6C, the upper substrate 300 is formed. Specifically, the color filter layer 304 and the light blocking layer 306 are formed on the second base substrate 302. The over-coating layer 308 is formed on the color filter layer 304 and the light blocking layer 306. The common electrode 310 is formed on the over-coating layer 308. Thus, the upper substrate 300 is formed.

The lower substrate 200 and the upper substrate 300 are combined with each other, and the liquid crystal layer 400 is interposed between the lower substrate 200 and the upper substrate 300. The liquid crystal layer 400 includes the liquid crystals, and the alignment of the liquid crystals is changed by the electric field generated by the pixel voltage applied to the pixel electrode 270 and the common voltage applied to the common electrode 310. Thus, the display panel 110 is formed.

According to the present exemplary embodiment, the light sensing part 240 decreases the pixel voltage of the pixel electrode 270 when the external light is relatively bright, and the light sensing part 240 increases the pixel voltage of the pixel electrode 270 when the external light is relatively dark. Thus, the light sensing part 240 decreases the grayscale of the pixel when ambient light near the display panel 110 is relatively bright, and the light sensing part 240 increases the grayscale of the pixel when ambient light near the display panel is dark. In addition, when a laser beam is incident onto the display panel 110, an area of the display panel 110 onto which the laser beam is incident may be displayed relatively dark.

Figure 7:
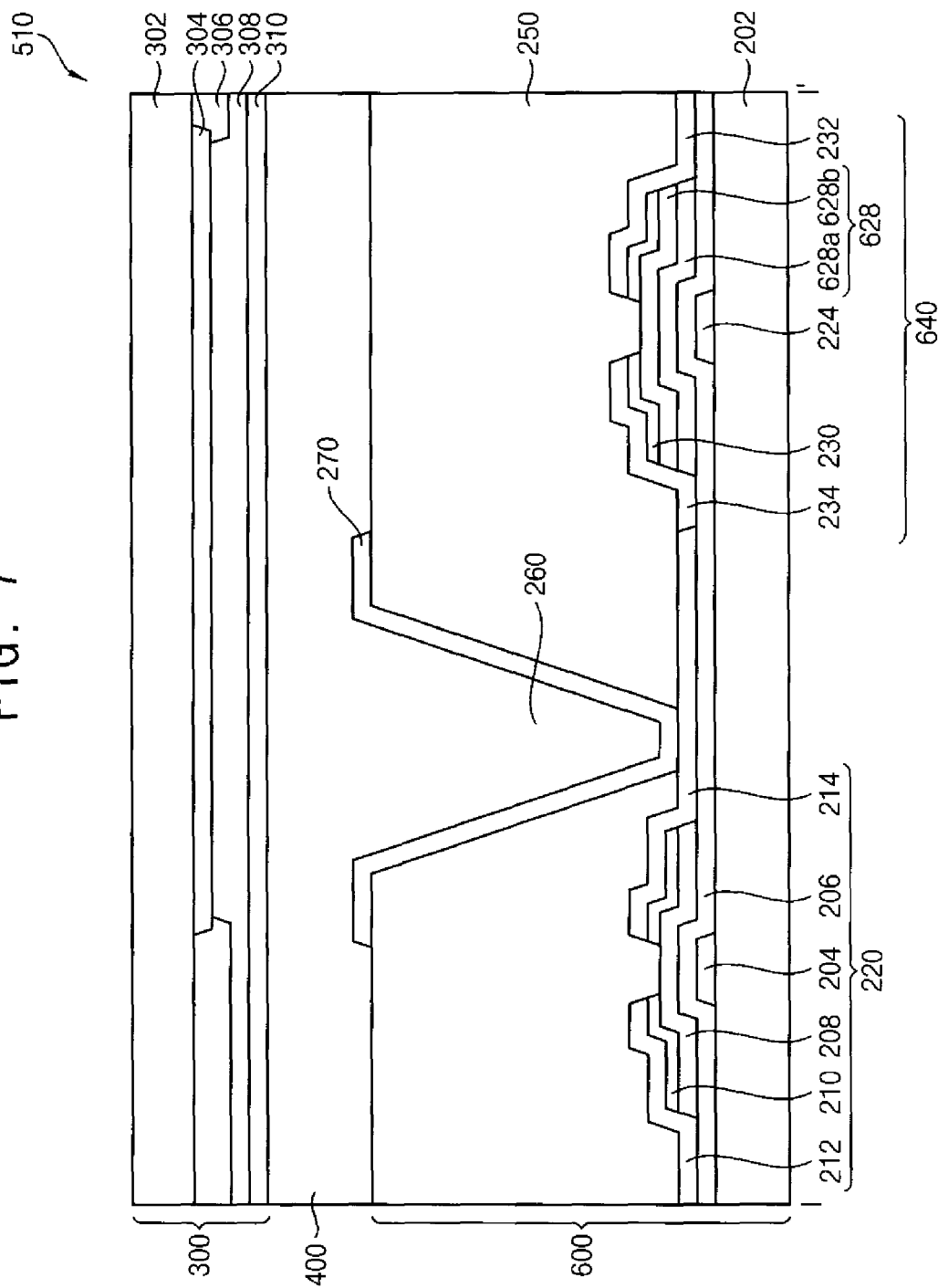
FIG. 7 is a cross-sectional view illustrating a display panel according to another exemplary embodiment of the present invention.

FIG. 7 is a cross-sectional view illustrating a display panel according to another exemplary embodiment of the present invention.

The display panel 510 according to the present exemplary embodiment may be used in the display apparatus 100 illustrated in FIG. 1, and the display panel 510 according to the present exemplary embodiment is substantially the same as the display panel 110 according to the exemplary embodiment illustrated in FIG. 1 except for a second active layer 628 of a light sensing part 640 in a lower substrate 600. Thus, the same reference numerals will be used to refer to same or like parts as those described in the previous exemplary embodiment and any further repetitive explanation concerning the above elements will be omitted.

Referring to FIG. 7, the display panel 510 includes the lower substrate 600, the upper substrate 300, and the liquid crystal layer 400.

The lower substrate 600 includes the switching element 220 and the light sensing part 640.

The light sensing part 640 includes the second gate electrode 224 electrically connected to the ground line GRL, the gate insulating layer 206 formed on the second gate electrode 224, the second active layer 628 formed on the gate insulating layer 206, the second ohmic-contact layer 230 separately formed on the second active layer 628, the second source electrode 212 formed on the second ohmic-contact layer 230 and electrically connected to the ground line GRL, and the second drain electrode 234 formed on the second ohmic-contact layer 230, spaced apart from the second source electrode 232 and electrically connected to the first drain electrode 214 of the switching element 220.

The light sensing part 640 is not covered by the light blocking layer 306 in the upper substrate 300. Thus, the light sensing part 640 may be exposed to the external light. In addition, the light sensing part 640 may be exposed to the internal light generated from the backlight assembly.

The second active layer 628 of the light sensing part 640 includes a lower layer 628a and an upper layer 628b.

A work function of the lower layer 628a may be equal to or greater than the work function of the second gate electrode 224. In addition, the lower layer 628a may include a material of which a light reactivity is comparatively low. Thus, the lower layer 628a includes a material which is stable in the presence of light. For example, the lower layer 628a may include IGZO.

An intensity of a donor disposed in a forbidden band between a balance band and a conductive band of the upper layer 628b may be about $1*10^{17}/cm^3$. The upper layer 628b may include a material having comparatively high light reactivity. Thus, the upper layer 628b may include a material which is unstable in the presence of light. For example, the upper layer 628b may include zinc (Zn), and may further include at least one of indium (In) and tin (Sn) material.

A method of manufacturing the display panel 510 in FIG. 7 is substantially the same as the method of manufacturing the display panel 110 described with reference to FIGS. 6A to 6D except for forming the lower layer 628a and the upper layer 628b in forming the second active layer 628 of the light sensing part 640. Thus, any further repetitive explanation concerning the method of the display panel 510 will be omitted.

According to the present exemplary embodiment, the light sensing part 640 includes the lower layer 628a having the material stable in the presence of light and the upper layer 628b having the material unstable in the presence of light. Therefore, the light sensing part 640 does not respond to the internal light generated from the backlight assembly but does respond to the external light, and thus a reliability of the light sensing part 640 may be enhanced.

According to the display substrate, the method of the display substrate and the display panel having the display substrate, a light sensing part decreases a grayscale of a pixel when ambient light near the display panel is relatively bright, and increases the grayscale of the pixel when ambient light near the display panel is relatively dark. Thus, a visibility of the display panel may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display substrate comprising:
   a substrate;
   a gate line disposed on the substrate;
   a data line disposed on the substrate;
   a switching element disposed on the substrate and electrically connected to the gate line and the data line;
   a pixel electrode electrically connected to the switching element; and
   a light sensing part electrically connected to the switching element and the pixel electrode, the light sensing part configured to control a grayscale of a pixel according to a brightness of an external light, the pixel comprising the pixel electrode,
   wherein:
   the switching element comprises a first thin-film transistor (TFT) and the light sensing part comprises a second TFT, the second TFT comprising an active layer comprising a lower layer and an upper layer; and
   the lower layer comprises a first material and the upper layer comprises a second material, and a first light reactivity of the first material is lower than a second light reactivity of the second material.

2. The display substrate of claim 1, wherein the light sensing part is configured to control a pixel voltage applied to the pixel electrode.

3. The display substrate of claim 2, wherein the light sensing part is configured to increase the pixel voltage as the brightness of the external light is decreased.

4. The display substrate of claim 2, wherein the light sensing part is configured to decrease the pixel voltage as the brightness of the external light is increased.

5. The display substrate of claim 1, wherein:
the first TFT comprises a first gate electrode electrically connected to the gate line, a first source electrode electrically connected to the data line, and a first drain electrode electrically connected to the pixel electrode; and
the second TFT comprises a second gate electrode electrically connected to a ground line, a second source electrode electrically connected to the ground line, and a second drain electrode electrically connected to the pixel electrode.

6. The display substrate of claim 5, wherein the display substrate further comprises the ground line.

7. The display substrate of claim 1, wherein the second TFT comprises an oxide semiconductor.

8. The display substrate of claim 7, wherein the second TFT comprises an IGZO (In—Ga—Zn—O) transistor.

9. A method of manufacturing a display substrate, the method comprising:
forming a switching element and a light sensing part on a substrate, the switching element and the light sensing part being electrically connected to each other;
forming an insulating layer on the switching element and the light sensing part; and
forming a pixel electrode on the insulating layer, the pixel electrode being electrically connected to the switching element and the light sensing part, a pixel voltage applied to the pixel electrode being controlled according to a brightness of an external light applied to the light sensing part from an external environment,
wherein:
the switching element comprises a first thin-film transistor (TFT) and the light sensing part comprises a second TFT, the second TFT comprising an active layer comprising a lower layer and an upper layer; and
the lower layer comprises a first material and the upper layer comprises a second material, and a first light reactivity of the first material is lower than a second light reactivity of the second material.

10. The method of claim 9, wherein the first TFT comprises a first gate electrode electrically connected to the gate line, a first source electrode electrically connected to the data line, and a first drain electrode electrically connected to the pixel electrode, and
the second TFT comprises a second gate electrode electrically connected to a ground line transferring a ground voltage, a second source electrode electrically connected to the ground line, and a second drain electrode electrically connected to the pixel electrode.

11. A display panel comprising:
a first substrate comprising a first base substrate, a switching element disposed on the base substrate and electrically connected to a gate line and a data line, a pixel electrode electrically connected to the switching element, and a light sensing part electrically connected to the switching element and the pixel electrode and configured to control a grayscale of a pixel according to a brightness of an external light, the pixel comprising the pixel electrode; and
a second substrate comprising a second base substrate facing the first base substrate and a common electrode disposed on the second base substrate, the common electrode and the pixel electrode configured to form an electric field,
wherein:
the switching element comprises a first thin-film transistor (TFT) and the light sensing part comprises a second TFT, the second TFT comprising an active layer comprising a lower layer and an upper layer; and
the lower layer comprises a first material and the upper layer comprises a second material, and a first light reactivity of the first material is lower than a second light reactivity of the second material.

12. The display panel of claim 11, wherein the light sensing part is configured to control a pixel voltage applied to the pixel electrode.

13. The display panel of claim 12, wherein the light sensing part is configured to increase the pixel voltage as the brightness of the external light decreases.

14. The display panel of claim 12, wherein the light sensing part is configured to decrease the pixel voltage as the brightness of the external light increases.

15. The display panel of claim 11, wherein the first TFT comprises a first gate electrode electrically connected to the gate line, a first source electrode electrically connected to the data line, and a first drain electrode electrically connected to the pixel electrode, and
the second TFT comprises a second gate electrode electrically connected to a ground line, a second source electrode electrically connected to the ground line, and a second drain electrode electrically connected to the pixel electrode.

16. The display panel of claim 11, wherein the upper substrate further comprises a light blocking layer configured to block the external light, the switching element is covered by the light blocking layer, and the light sensing part is exposed to the external light by an opening in the light blocking layer.

* * * * *